United States Patent
Gruau et al.

(10) Patent No.: US 8,025,825 B2
(45) Date of Patent: *Sep. 27, 2011

(54) METHOD OF PRODUCING A COMPRESSION-MOULDED PLASTIC PART COMPRISING A NECK WHICH IS EQUIPPED WITH A DISPENSING ORIFICE

(75) Inventors: Bertrand Gruau, Braux Sainte Cohiere (FR); Herve Zakrzewski, Verdun (FR)

(73) Assignee: Cebal SAS, Clichy (FR)

( * ) Notice: Subject to any disclaimer, the term of this patent is extended or adjusted under 35 U.S.C. 154(b) by 2006 days.

This patent is subject to a terminal disclaimer.

(21) Appl. No.: 10/501,929

(22) PCT Filed: Mar. 17, 2003

(86) PCT No.: PCT/FR03/00837
§ 371 (c)(1),
(2), (4) Date: Jul. 28, 2004

(87) PCT Pub. No.: WO03/078126
PCT Pub. Date: Sep. 25, 2003

(65) Prior Publication Data
US 2005/0051928 A1 Mar. 10, 2005

(30) Foreign Application Priority Data
Mar. 18, 2002 (FR) ..................... 02 03332

(51) Int. Cl.
*B28B 1/48* (2006.01)
(52) U.S. Cl. .......... 264/154; 264/318; 215/48; 220/266; 220/276
(58) Field of Classification Search ........... 264/318, 264/319, 161, 154; 215/48; 220/266, 276
See application file for complete search history.

(56) References Cited

U.S. PATENT DOCUMENTS

| 2,583,441 | A |   | 1/1952  | Palmer |
|-----------|---|---|---------|--------|
| 2,714,226 | A | * | 8/1955  | Axelrad ................. 425/547 |
| 2,994,297 | A | * | 8/1961  | Toulmin, Jr. ............ 118/715 |
| 3,313,875 | A |   | 4/1967  | Magerle |
| 3,340,569 | A | * | 9/1967  | Hagen .................... 425/532 |
| 4,314,799 | A | * | 2/1982  | Amberg et al. .......... 425/296 |
| 4,610,621 | A |   | 9/1986  | Taber et al. |
| 4,623,117 | A |   | 11/1986 | Ueberegger |
| 4,822,273 | A | * | 4/1989  | Adams et al. .......... 425/385 |
| 5,346,659 | A | * | 9/1994  | Buhler et al. ........... 264/68 |
| 5,927,567 | A |   | 7/1999  | Fillmore |

(Continued)

FOREIGN PATENT DOCUMENTS
EP 524897 1/1993
(Continued)

*Primary Examiner* — Richard Crispino
*Assistant Examiner* — Elizabeth Royston
(74) *Attorney, Agent, or Firm* — Dennison, Schultz & MacDonald

(57) ABSTRACT

A method for the compression molding of a plastic part including a neck which is equipped with an orifice, in which a blank is created and compressed. The part is molded with a neck which is equipped with a top wall including a thin area with a notch, the contour of this thin area defining the orifice, and two zones which can withstand the mechanical stress necessary in order to break the top wall at the notch. One of the two zones is intended to transmit the mechanical stress and the other is used as a support. The section of the notch is slightly inclined in relation to the axis of the neck. After molding, mechanical stress is applied to one part of the top wall, other than the thin area, so that the top wall tears at the notch, thereby producing the dispensing orifice.

11 Claims, 5 Drawing Sheets

U.S. PATENT DOCUMENTS

| | | | |
|---|---|---|---|
| 6,283,744 B1 * | 9/2001 | Edmondson et al. | 425/403 |
| 6,382,438 B1 * | 5/2002 | Schneider et al. | 215/48 |
| 7,037,456 B2 * | 5/2006 | Gruau et al. | 264/248 |
| 2003/0039717 A1 * | 2/2003 | Hwang et al. | 425/556 |

FOREIGN PATENT DOCUMENTS

| | | |
|---|---|---|
| GB | 971921 | 10/1964 |
| GB | 1405411 | 10/1975 |
| JP | 02/258218 | 10/1990 |

* cited by examiner

METHOD OF PRODUCING A COMPRESSION-MOULDED PLASTIC PART COMPRISING A NECK WHICH IS EQUIPPED WITH A DISPENSING ORIFICE

This application is a filing under 35 USC 371 of PCT/FR2003/000837 filed Mar. 17, 2003.

BACKGROUND OF THE INVENTION

The invention relates to a compression moulding manufacturing method for plastic parts with a neck in which an orifice is formed. These parts are usually receptacles or part of receptacles. The invention is more particularly applicable to conditions for high production rate manufacturing of moulded objects, that usually have an axisymmetric neck delimiting an approximately circular orifice, for example heads of flexible plastic tubes comprising a neck provided with a dispensing orifice and a shoulder connecting the said neck to a cylindrical flexible skirt. We will use these flexible tube heads to illustrate this invention.

In general, a flexible tube is made by assembly of two parts made separately; a cylindrical flexible skirt with a given length (typically 3 to 5 times the diameter) and a head comprising a neck provided with a dispensing orifice and a shoulder connecting the said neck to the cylindrical skirt. The plastic head may be moulded separately and then welded onto one end of the skirt, but the head is advantageously moulded and welded autogenously to the skirt using either an injection moulding technique (FR 1 069 414) or a compression moulding technique for an extruded blank (FR 1 324 471).

In both of these two techniques, the skirt is fitted around a punch, one of the two ends projecting slightly beyond the end of the punch, the said end of the punch acting as a mould for making the inner surface of the tube head (inner surface of the shoulder and the neck). A die is used in these two techniques, that comes into contact with the end of the punch, the cavity of this die defining the outer surface of the shoulder and the neck. The main difference between these methods is that in the first case, these tools are firstly pushed firmly into contact with each other before injection of the plastic material, and in the second case compression of an extruded blank is triggered as they move towards each other.

In French application No. 0103706 deposited on 19 Mar. 2001, the applicant indicated that a significant increase in production rates (for example above 250-300 units per minute) could be achieved using the compression moulding technique. In the context of this French application No. 0103706, the applicant presented a workshop for making flexible tubes in which tube heads were made by compression moulding using continuously moved tools, which provided a means of obtaining significantly higher production rates under economically acceptable conditions.

In compression moulding, production of the blank and its placement in the moulding tool creates specific problems for which solutions have been described in a large number of patents. But these problems are exacerbated when it is envisaged to use tools that move continuously and solutions proposed in the past are not suitable for this new constraint.

French application FR 1 324 471 (Karl Mägerle) describes a compression moulding method for tube heads in which the lower mould is composed of the end of a mandrel and the end of a skirt that is fitted around this mandrel, the end of the said skirt projecting beyond the end of the said mandrel; the space delimited by the end of the mandrel and the projecting part of the skirt is fed by injecting plastic material through several uniformly distributed orifices within a nozzle; the plastic material is distributed around a counter punch formed at the end of the mandrel and used to mould the inner part of the neck. Once the necessary quantity of plastic material has been injected, the nozzle is removed, the parts of the top mould are brought towards each other by radial displacement, and the plastic material is then compressed by bringing the lower mould towards the upper mould. The jets are uniformly distributed around the circumference and the material thus poured is distributed approximately uniformly around the circumference before compression is applied. The result is then an approximately uniform thickness around the dispensing orifice.

Applications FR 2 460 772 (Karl Mägerle) and U.S. Pat. No. 4,943,405 (AISA) use the idea of compressing the plastic material when it is already distributed approximately regularly circumferentially. These applications propose a toroidal extruded blank, that is fitted around a central protuberance connected to one of the mobile parts of the tool. Fitting a toroidal blank around a protuberance authorises bringing the two parts of the moulding tool located at the dispensing orifice into contact with each other before the plastic material of the compressed blank reaches this zone. More precisely, the air gap between these two tool parts is so small that no viscous flow of the plastic material can occur. Thus, with a toroidal blank, it is easier and more direct to obtain a neck provided with an orifice with a clean edge.

In FR 2 460 772, the toroidal blank is extruded using an extruding machine with a ring die opened under the control of a valve. This valve may or may not close off the annular flow of the plastic material depending on its position, and its displacement controls the size of the toroidal blank thus obtained. The use of toroidal blanks obtained by discontinuous extrusion of plastic material controlled using a valve is therefore the only known way in prior art of efficiently and directly obtaining a neck with an orifice provided with a clean edge, directly by compression moulding. However, this type of technique is not very precise and it cannot give good reproducibility of the weight of a toroidal blank, which complicates compression moulding conditions, for example compression moulding does not have the same flexibility as injection moulding, for which all surplus material can easily be evacuated.

Moreover, the toroidal blank is cooled fairly quickly by conduction in the tooling. Since the contact surface is not uniformly distributed, cooling is heterogeneous and a large proportion of the advantage provided by the toroidal geometry of the blank, namely good distribution of the material before compression, is lost. Many solutions have been proposed like that proposed in WO96/09151 (Karl Mägerie Lizenz) to reduce the amplitude and heterogeneity of cooling of the blank before compression, but they require the introduction of additional tooling elements (for example the auxiliary support sliding around the central protuberance described in WO96/09151) and means of controlling their displacement. This type of sophistication makes this type of tool economically unattractive or even prohibitive if it is required to make the mobile parts of the tooling follow a continuous overall movement.

Finally, production of the toroidal blank and its placement in the air gap between the punch and the die introduce serious difficulties when the tools are moved with continuous dynamic movements, since extrusion and injection are not suitable for continuous movement of tools, and transfer means have to be provided capable of either displacing the extrusion means themselves so that the blank can be obtained, or the toroidal blank obtained "statically" has to be recovered and placed in the air gap of the compression tools that move continuously, without deforming it too seriously.

Application EP 0 841 258 describes a compression moulding manufacturing method for plastic inserts that are introduced in proportioning caps. These inserts are provided with a cylindrical dispensing spout and have a wall closing off the dispensing orifice, which seems to indicate that the blank used is not necessarily toroidal, that it can be solid making it easier to make, and there are fewer difficulties in depositing it in the air gap of the tooling. But this wall must be removed after the insert has been formed by cutting it out using a cutting tool. This cutting operation involves a series of additional steps, and although this is possible for fairly small inserts, it is difficult to transpose it to the use of compression moulding for shaping the tube head with autogenous welding of the head onto the skirt, since the tooling involved is larger and more complex. The problem becomes even more complicated if they are to move along a continuous overall movement.

Therefore, the applicant tried to find a method for the use of compression moulding for manufacturing plastic parts provided with a neck with an orifice, that is not affected by the problems mentioned above and that can consequently be done easily using continuously moving tools.

SUMMARY OF THE INVENTION

The objective of the invention is a compression moulding manufacturing method for plastic parts with a neck provided with an orifice, comprising a first step for making a plastic blank and a second step for compression of the said blank, in which the said blank is brought to an appropriate temperature and is then placed in the air gap between at least two moving parts of the compression tool and is then compressed by bringing the two mobile parts of the tooling towards each other, the plastic material of the blank flowing so as to fill the cavities in the said mobile parts until the said mobile parts stop moving relative to each other, the cavities of the said mobile parts of the tooling once brought together defining the volume of the said part with a neck, the said cavities being designed such that the said neck, once moulded, has a top wall that comprises a thinned zone for which the contour delimits the required shape of the orifice, the said method being characterised in that the said thinned zone is bounded by a notch for which the section in a diametric plane passing through the axis of the neck is oriented along a direction approximately parallel to the axis of the neck, and in that the said top wall also comprises a zone in which a mechanical force is applied that will be applied to the said top wall with sufficient intensity to break the top wall at the said notch, the said application zone being distinct from the thinned zone, the said top wall also including two zones that can resist the said mechanical force, one of them being designed to transmit the said mechanical force and the other to act as a support, and in that after opening the said moulding tool by relative displacement of its mobile parts, the next step is to apply the said mechanical force in the said application zone such that a break will occur at the said notch and at least part of the top wall is detached thus opening up the dispensing orifice.

The said notch has a section in a diametric plane passing through the axis of the neck oriented in a direction approximately parallel to the axis of the neck, in the sense that it makes a fairly small angle with the said axis, typically between 0 and 45° and preferably between 0 and 30°.

In the following, we will refer to the thinned zone of the top wall at the notch as the rupture zone or the breakoff zone. The breakoff zone is thus a part of the thinned top wall, for which one of the faces is provided with a notch. This notch may be on the bottom face of the top wall, but it will preferably be on the top face of the top wall so that any deformations of the residual thinned zone resulting from the failure will not create any geometric visible or touchable defects (splinters causing injury).

The top wall is not necessarily a wall with a constant thickness. It may comprise different parts, some of which may be solid but it comprises at least one part that acts as a wall closing off the dispensing orifice.

The moulding tool designed to make the moulded part is conventional; it includes at least two mobile parts free to move with respect to each other. In the case of a tube head, these two parts are the punch and the die. The neck very often needs to have a screw thread on its outer wall, which imposes that a die should be used itself composed of several mobile parts that move away from each other—for example using radial displacements—to facilitate unmoulding of the threaded part.

The moulded part according to the invention has a neck that is initially provided with an orifice; the orifice is made in a subsequent step, without the need to use a cutting tool. Consequently, compression may be achieved using a blank that is not necessarily toroidal, that has a solid shape that is firstly easier to obtain with a reproducible weight (improvement of compression moulding conditions) and secondly reduces the amplitude and heterogeneity of cooling. This part has better reproducibility by weight since a solid extrudate can be extruded with shears at the exit from the die; the material quantity thus obtained depends on the displacement perpendicular to the extrusion direction of a shear blade external to the die and not on the displacement of a valve sliding in the axial direction inside the die, and that discontinuously closes off a ring orifice.

There is a top wall above the neck that temporarily closes the orifice and part of which (that we will subsequently call the shutter) is partially or completely detached in a subsequent step in the method by applying a simple mechanical force to part of the top wall, called the application zone of the mechanical force, and distinct from the breakoff zone.

The top wall comprises at least four zones; a zone in which the mechanical force is applied, a zone of mechanical force transmission, a breakoff zone and a pressure zone. The mechanical force will be applied locally on the said top wall near the application zone, with a sufficient intensity to break off the said top wall at the said notch. The intensity of the force necessary to cause breakage depends on the direction of the said mechanical force and the distance between the point of application of this force and the breakoff zone.

In one preferred embodiment, the shutter (in other words the part of the top wall that is partially or completely detached after the breakoff zone) is the zone that transmits applied forces to tear the top wall at the notch and the part corresponding to the attachment of the top wall onto the neck is the support zone. The geometry of the shutter is arbitrary provided that it is adapted to the type of mechanical force that has to be applied to cause breakage. It may be in the shape of a stick to amplify a force applied at its end by the lever effect, as illustrated in FIG. 1, or it may be in the form of a simple wall as illustrated in FIG. 4, or it may be provided with a protuberance for which the cross-section is in the shape of a non-convex polygon (FIG. 5) or for which the section (in a diametric plane through the axis) is in the form of a T shape as shown in FIG. 3. The notch follows an arbitrary curve, not necessarily plane and not necessarily closed. If it is closed, breakage of the breakoff zone causes complete detachment of the shutter. This shutter can advantageously be taken out, preferably using the residual part of the energy provided to break the breakoff zone. The notch may also have an open contour. In this case, breakage of the breakoff zone causes partial detachment of the shutter. The shutter is then in the form of a tongue that must be held folded in an open position such that the orifice is delimited by the contour of the broken breakoff zone and the bottom of the tongue thus obtained and held folded. In the latter case, there is no need to remove the partially detached shutter.

A notch is formed in the breakoff zone, for which the section in a diametric plane passing through the axis of the neck is oriented along a direction that is only slightly inclined with respect to the axis of the neck. For example, if the notch is V-shaped, the bisecting line of the V is only slightly inclined with respect to the axis of the neck and is in the shape of a cylinder or a cone with an angle at the centre of less than 90°, and preferably less than 60°. Thus, the said bisecting line forms an angle of between 0 and 45°, and preferably between 0 and 30°, with the axis of the said neck. The angle of the V is between 30 and 90°, typically between 40 and 50°. The V does not necessarily have its arms symmetrical about its bisecting line.

In general, the required orifice is simply circular and the breakoff zone is a ring notch for which the cross-section is a V for which the internal arm (in other words the arm closest to the axis) is slightly inclined with respect to the axis and for which the external arm is more strongly inclined. Typically, the internal branch of the V forms an angle of less than 5° with the axis, the bisecting line is at an angle of 25° with the axis of the neck and the angle between the outside arm and the axis of the neck is less than 55°.

The shape of the notch locally enables concentration of stresses generated by the application of a mechanical force, regardless of whether it is a force or a moment applied at a particular location on the shutter. The transverse wall may be small, for example limited to the breakoff zone, but it must be present to orient the notch such that its axis is approximately parallel to the axis of the neck.

The applicant has observed that this type of geometry concentrates the breakage energy and tolerates a large number of mechanical stresses that can cause controlled tearing of the breakoff zone. This tolerance is much greater than with a ring notch, for example located on the wall of the neck and which has a section (in an axial diametric plane) in the shape of a V for which the bisecting line is perpendicular to the axis of the neck.

Due to the presence of the notch, the easily breakoff zone is thinner than the neighbouring zones. Preferably, the residual thickness under the notch is 30% less than the global thickness of the transverse wall outside the notch. Typically, for the envisaged receptacle geometries, it is between 0.1 and 0.6 mm. Since it is thin, it cools more quickly than other parts of the neck, so that forces causing breakage can be applied without necessarily applying shocks, in other words applying forces causing deformation rates of the order of $10^3$ $s^{-1}$. The mechanical force may for example be an axial thrust or tension, rotation about the axis of the neck, a combination of the two (for example during unscrewing—stripping the head), a force applied on the other end of the stick-shaped shutter, etc.

In one preferred embodiment of the invention, the shutter breaks during cooling after moulding, as soon as the material stabilises, which provides a means of breaking the shutter before the part is ejected outside the moulding tool. It is recommended that the breakoff zone should be broken as soon as the temperature of the plastic material becomes close to its vitreous transition temperature in the said breakoff zone, or otherwise wait until the entire head has cooled, the temperature of the breakoff zone increasing as the moulded part cools due the thermal inertia of the thicker zones surrounding it.

It is also advantageous to place the blank to be compression moulded above or directly facing the end of the protuberant part of the moulding tool that will be used to make the inner surface of the neck. The part of the blank that is in contact with the tool cools slightly faster than the rest of the blank by conduction. Surface imperfections related to the increased cooling of the plastic material at this location, to friction and the resulting heterogeneous material flow, will remain on the shutter that will then be detached. Therefore, they will not be visible.

This method is particularly advantageous when continuously moving moulding tools are used, like those described in French application No. 01 03706 deposited by the applicant on Mar. 19 2001. In this application, apart from the fact that movement towards each other will cause compression of a blank, moulding tools are also moved by a continuous general movement with a component that is not necessarily plane but that remains orthogonal to the direction along which they move towards each other. Example 2 described below illustrates an embodiment of the invention applied firstly to production and placement of blanks on continuously moving moulding tools, and secondly to making the orifice while the moulded tube head is still inserted on the moving punch.

Another solution applicable for a continuously moving system consists of making part of the shutter in the shape of a stick similar to the shape in example 1 and applying a force at the end of the stick as soon as the die has moved away from the punch, for example using a fixed pin in front of which the punch still fitted with the tube head moves. Under the effect of bending imposed on the stick and transmitted by the stick to the transverse wall, the breakoff zone breaks and the shutter is ejected along a precise and reproducible direction away from the non-stop manufacturing line.

To obtain a clear and reproducible break, the modulus of elasticity of the material in tension at room temperature is preferably more than 200 MPa, and preferably more than 500 MPa.

Although this method was developed for non-stop manufacturing of moulded parts with a neck containing an orifice, it may also be applied to moulding methods in which machines are working on individual parts. Due to the design of the breakoff zone involved, the method according to the invention is used to choose, among a large number of possible mechanical forces, the mechanical force to obtain a controlled tear offing of the breakoff zone at lower cost.

The final step in the method in which the shutter is torn off, may be included in the actual manufacturing (used during cooling and after moulding, or immediately before being removed from the non-stop manufacturing line, etc.). It may also be delayed until the first use; example 5 illustrates this case, in which the user activates the shutter break mechanism when he unscrews the stopper for the first time. This embodiment of the invention can result in tube heads provided with a system guaranteeing that the tube has not been violated before it was used for the first time.

BRIEF DESCRIPTION OF THE DRAWINGS

The set of Figures illustrates the manufacture of flexible tubes. Apart from FIG. 3, they show diametric sections through tube heads, parts of the compression moulding tool, or caps.

DESCRIPTION OF THE PREFERRED EMBODIMENTS

Figure 1A:
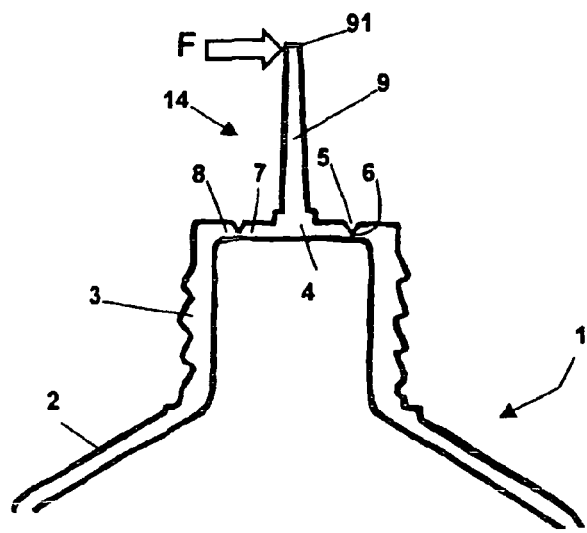
FIG. 1a shows a particular tube head made according to the invention, before the force necessary to break the breakoff zone is applied.
Figure 1B:
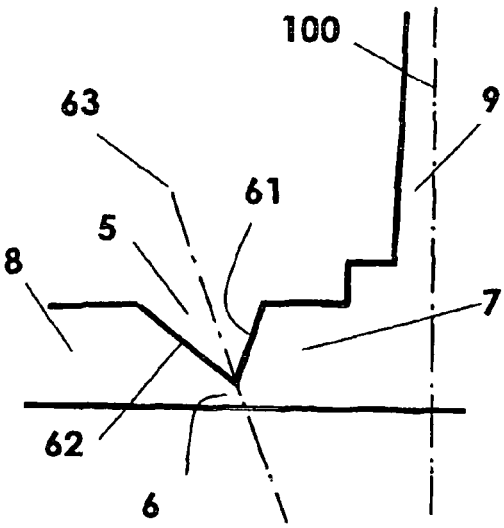
FIG. 1b shows a particular shape of the section through the breakoff zone according to the invention.

Example 1 (FIGS. 1a and 1b)

Tube Head Designed Within the Context of the Method According to the Invention

The tube head 1 illustrated in FIG. 1a shows a shoulder 2 and a neck 3 in which there is a top wall 4 above the top end, the top wall including at least one thinned zone 6 for which the upper face is provided with a notch 5 for which the closed contour delimits the required shape of the orifice. This thinned zone 6, also called the breakoff zone, is surrounded by two zones 7 and 8 capable of resisting the mechanical force F necessary to break the said breakoff zone, one of them (7) being intended to transmit the said mechanical force and the other (8) to act as a thrust application zone.

The shutter 14 is the part of the top wall 4 that is detached, and in this case removed by application of the mechanical force F on the end 91 of the stick 9. The force application zone is end 91 of stick 9. The zone that will transmit the mechanical force includes the stick 9 and the wall 7. Application of the mechanical force F amplified by the effect of the lever arm formed by the stick 9, has the consequence of breaking the breakoff zone and evacuating the said shutter 14.

The breakoff zone 6 is notched with a V-shaped notch 5, with an inner arm 61 that forms an angle of 5° with the axis of the neck, an external arm 62 that forms an angle of 55° with the said axis, and the bisecting line 63 of the V that forms an angle of 25° with the axis of the neck.

In the special case of this example, the head is moulded with high density polyethylene. Its neck 3 has an outer diameter of 11.5 mm and an average thickness of 1.5 mm (excluding the screwing thread). The transverse wall 7 is approximately 1 mm thick, and is connected to the top end 8 of the neck 3 that acts as a support zone. The height of the stick 9 is 10 mm, the residual thickness of the wall at the breakoff zone is 0.3 mm.

All that is necessary is to apply a force F equal to approximately 1 Newton, to tear the breakoff zone so that the shutter will be ejected. Once the shutter has been removed, there is a 7 mm diameter orifice in neck 3 that is free from any runs or local deformation.

If continuous moving moulding tools are used as in example 2, the punch on which the head 1 of the tube is fitted moves in front of a fixed pin, as soon as the die moves away. This fixed pin retains the end 91 of the moving stick 9, and under the effect of the bending imposed on the stick and transmitted through the stick to the transverse wall 5, the breakoff zone 6 breaks off and the shutter is ejected along a precise and reproducible direction away from the continuously moving production line. The applicant obtained clean and sharp cuts in the breakoff zone with a linear velocity equal to or more than approximately 0.2 meters per second. Very satisfactory results were obtained at a velocity of 0.8 meters per second with heads moulded with high density polyethylene.

Example 2 (FIGS. 2a, 2b, 2c, 2d and 3)

Method According to the Invention Applicable to a Continuously Moving Method of Making Tube Heads by Compression Moulding The flexible tube is made by assembly of two parts made separately; a cylindrical flexible skirt 10 and a head similar to that described previously. The high density polyethylene head is moulded and autogenously welded onto an end 11 of the skirt 10, using a compression moulding technique for an extruded blank 20.

Figure 2A:
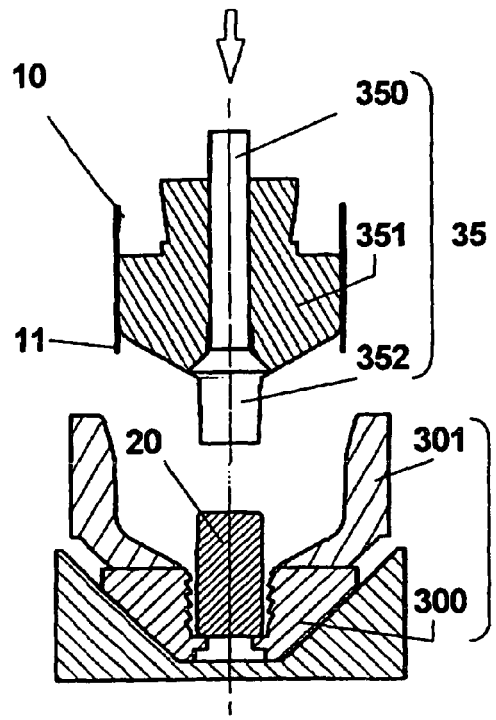
FIG. 2a shows a diametric section showing placement of a blank in a compression moulding tool.

FIG. 2a shows a diametric sectional view of the placement of a high density polyethylene blank 20 in a compression moulding tool. This moulding tool comprises a punch assembly 35 and a die assembly 30. Compression is obtained by reducing the distance between the punch assembly 35 and the die assembly 30 until the two parts of the tooling are relatively immobilised. Each of these parts of the tooling comprises parts (350 and 351, 300 and 301 respectively) that may be free to move with respect to each other, but which are fixed together during the compression. Relative displacement of these parts does not require the addition of any special control; it is controlled by the overall relative movement between the punch assembly and the die assembly. At the beginning of compression, the central protuberance 352 is fixed to the peripheral part 351 to form the punch assembly 35. The parts 300 become adjacent following a radial displacement imposed by a conical insertion, and the assembly fixed to the upper part 301 forms the die assembly 30.

The skirt 10 fits around the peripheral part 35 of the punch, one of its ends 11 projecting slightly beyond the end of this part 35 of the punch, which acts as a mould for making the inner surface of the tube head (inner surface the shoulder and the neck). The end 352 of the central part 350 of the punch is a central protuberance designed to mould the inside of the neck. The mobile parts 30 of the die move in the radial direction to free the screw thread once it has been moulded.

Figure 2B:
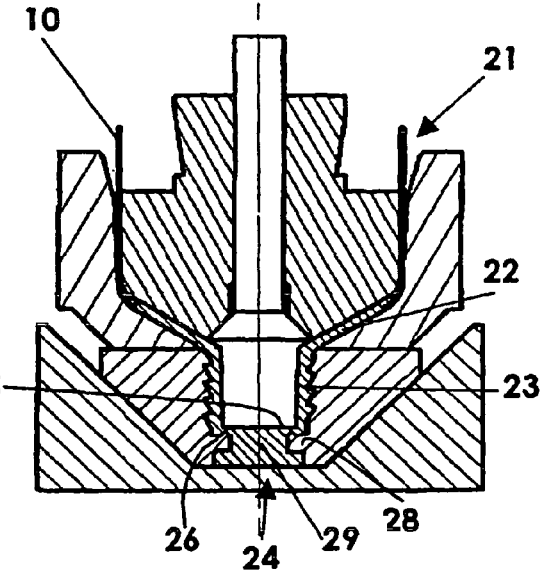
FIG. 2b shows the moulding tool and the moulded part at the end of compression. The moulded part has a T-shaped shutter so that there is a ring groove on the outer surface of the shutter.

FIG. 2b shows the moulding tool and the moulded part 21 at the end of compression; it is a flexible tube 21 including the cylindrical skirt 10, the shoulder 22 and the neck 23 on which a top wall 24 is fitted. The head was moulded and autogenously welded onto the end 11 of the skirt 10. The top wall 24 comprises a transverse wall 25 acting as a shutter closing off the dispensing orifice and a protuberance 29 with a T-shaped section, such that it comprises a ring groove 28 on its lateral wall.

Figure 2C:
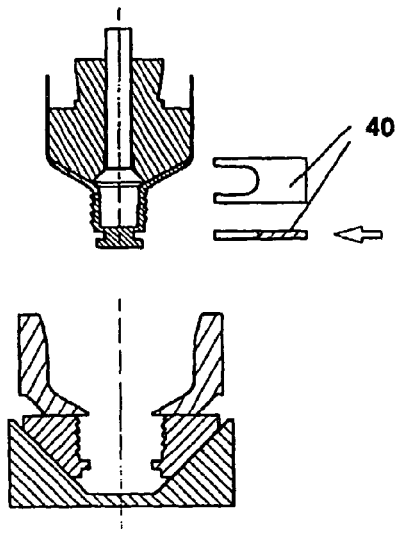
FIG. 2c shows separation of the punch provided with the head of the tube thus moulded. The ring notch is not shown, due to the scale used.

FIG. 2c shows the separation movement of the punch assembly from the die assembly. The flexible tube thus made remains fixed to the punch assembly and cools. A fork 40 is moved close to the tube head after a few seconds of cooling when the high density polyethylene has stabilised.

Figure 2D:
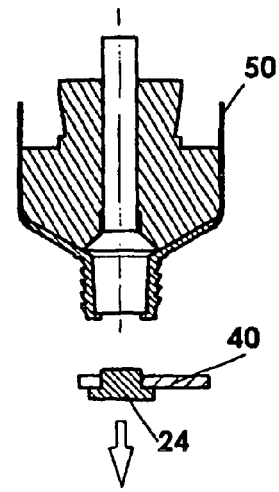
FIG. 2d shows elimination of the shutter after the breakoff zone has been broken off, caused by the axial displacement imposed by a fork, the prongs of which are engaged in the ring groove.

FIG. 2d shows evacuation of the top wall 24 after breakage of the breakoff zone, which was caused by the axial displacement imposed by the fork 40, the prongs of which are engaged in the ring groove 28. The geometry of the breakoff zone 26 with its ring V-shaped notch is identical to the geometry of the breakoff zone in example 1. In this way, the head of the finished tube 50 has a cylindrical neck provided with a dispensing orifice.

Figure 3:
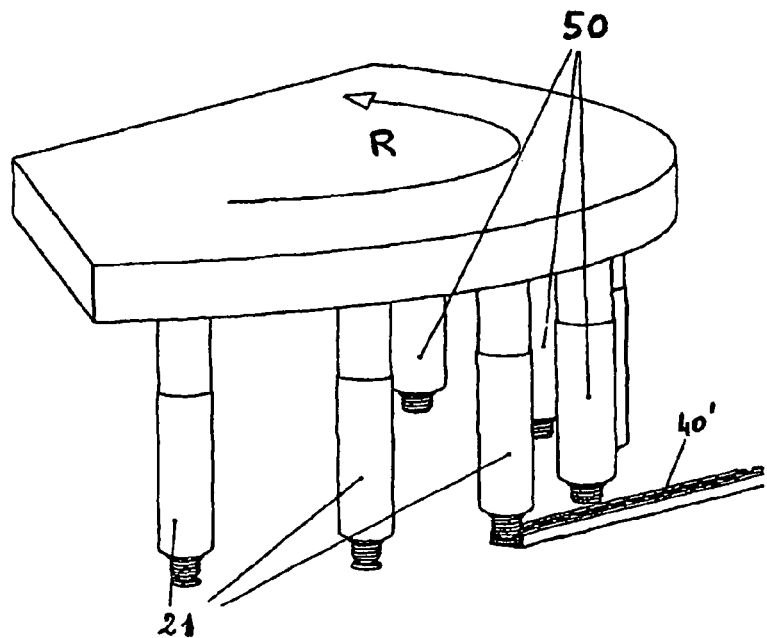
FIG. 3 shows a perspective view of a solution in which the tubes in FIGS. 2a to 2d are made using moulding tools that follow a continuous rotation movement and during this rotation, the shutters are simply removed by the ends of the said mobile shutters being trapped in a static rail that is not tangent to the trajectory of the tubes.

FIG. 3 shows an alternative solution to that shown in FIG. 2d; moulding tools, and particularly punches, follow a continuous rotation movement R like that imposed by the device reference 10 in FIG. 2 in French application No. 01 03706. Once formed, the tubes 50 remain fixed to the said punches after moulding, and shutters are removed simply by trapping the ends of the T-shaped shutters, their ring grooves 28 being engaged in a static rail 40' not tangent to the trajectory of the tube heads.

Figure 4:
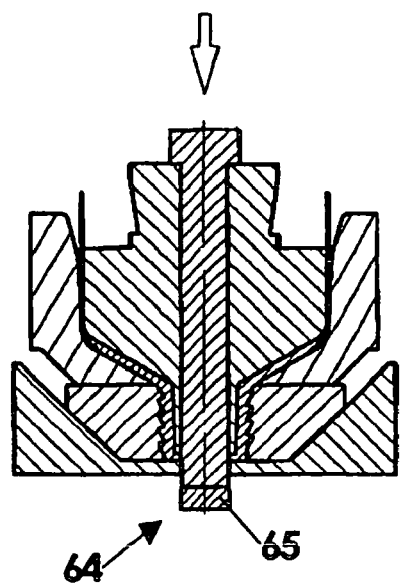
FIG. 4 shows another case in which the shutter is torn off and is then removed by applying an axial thrust.

Example 3 (FIG. 4)

FIG. 4 illustrates another method of production of the tube in which the head is also compression moulded and simultaneously welded onto the skirt, in which the top part 64 comprises a simple wall 65 with a ring notch close to its attachment onto the neck. The wall is torn off and then removed using an axial thrust. As illustrated in FIG. 4, the geometry of the shutter may be limited to the wall 65 or as illustrated in FIG. 1, it may include the said wall and also be provided with a stick shaped part to facilitate gripping and applying the axial thrust.

Figure 5:
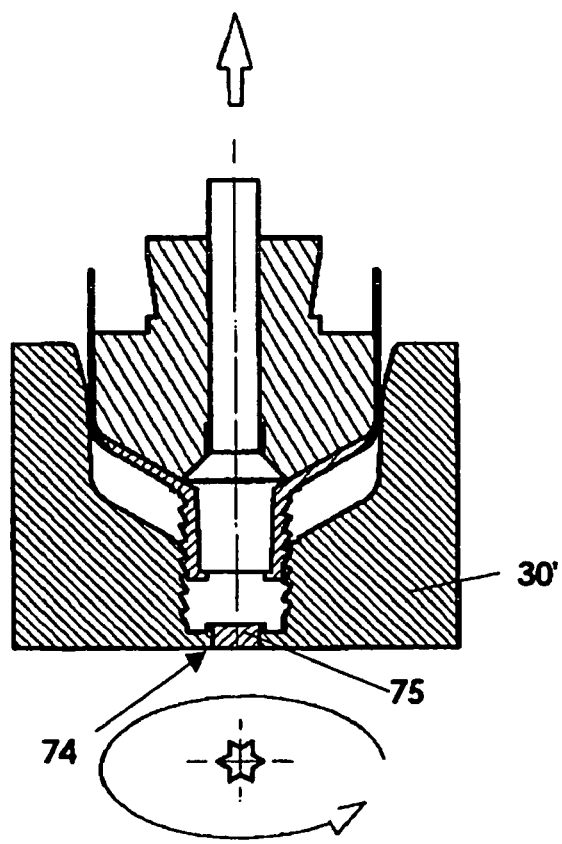
FIG. 5 shows another case in which the shutter is torn off and then removed using an unscrewing movement during stripping from the die.

Example 4 (FIG. 5)

FIG. 5 illustrates another case of production of the tube in which the head is also compression moulded and welded simultaneously onto the skirt, in which the top wall 74 includes a protuberance 75 with a non-convex polygonal section (typically a star) and a bottom part acting as a shutter. The die 30' does not contain any radially moving parts (300) and the head with its threaded neck is unmoulded by unscrewing. Since the non-convex polygonal protuberance 75 still occupies the cavity of the mould in which it was formed, it is prevented from rotating, the breakoff zone tears off under the effect of the resulting torsion, the protuberance is thus detached and removed during unscrewing.

This type of shutter can also be made on dies with parts that move in the radial direction (300). In this case, the tube head is unmoulded after cooling and the break off zone is then torn off and the shutter is removed by rotation using a key with a shape complementary to the shape of the concave polygonal section.

Example 5 (FIGS. 6a to 6h)

This example solves the difficult problem imposed by the extremely fine setting of the air gap existing at the end of travel distance between the mobile parts of the tool, particularly close to the cavity used to shape the breakoff zone. To obtain uniform breakage conditions on these tubes made at high production rate, it is important that the geometry of the breakoff zone should be as repeatable as possible, and its minimum thickness must not vary by more than a few hundredths of a millimeter.

It takes a long time to make this difficult setting of the air gap, which limits the production rate, particularly because it has to be done frequently (setting changes due to tool expansion, wear of active parts, etc.). Furthermore, there is a serious risk of tool breakage if there is a setting fault, lack of plastic material in the tooling, presence of a foreign body, etc. Finally, there is also an increased risk of an endurance defect in the tool due to its sensitivity to wear.

These various points are advantageously reduced if not entirely eliminated if the breakoff zone is formed by compression moulding of a blank between a rigid metallic element (for example belonging to the punch) and a less rigid element, for example made of plastic. Thus, a compression tool with a first mobile part and a second mobile part is used, the said first mobile part being made of a material that is less rigid than the material used for the said second mobile part, at least in part of the cavity contributing to shaping of the said breakoff zone. This may advantageously be achieved if this part of the neck is insert moulded directly on the stopper that will close off the dispensing orifice.

The association of two materials (one metallic, the other plastic) enables contact between two moulding parts without any risk of damage to either of the parts. The adjustment fineness of the air gap can thus be limited (reduction of the setting time), reducing the risk of damage to tools (mechanical stop on the cap, or tooling stop on the shoulder in the case of a stopper presence fault). Moreover, due to insert moulding, a receptacle plus stopper assembly is obtained directly in which the contact surfaces correspond to each other perfectly which enables hermetic closing of the receptacle throughout its usage duration.

Thus, in the context of this embodiment of the invention, one of the moving parts of the tooling (the die) may be provided with a stopper that will close off the said orifice. This stopper is positioned so that its inner surface acts partially as a moulding cavity to shape the said neck, at least at its breakoff zone.

The neck can be insert moulded on the stopper in a manner similar to the method described in example 4 in international application PCT/FR02/00686 deposited by the applicant. The objective in this method is to make a flexible tube. The tube head is moulded and welded to a cylindrical skirt obtained by cutting out from a sleeve. In this special case, the head is welded to the skirt at the same time as it is shaped.

Figure 6A:
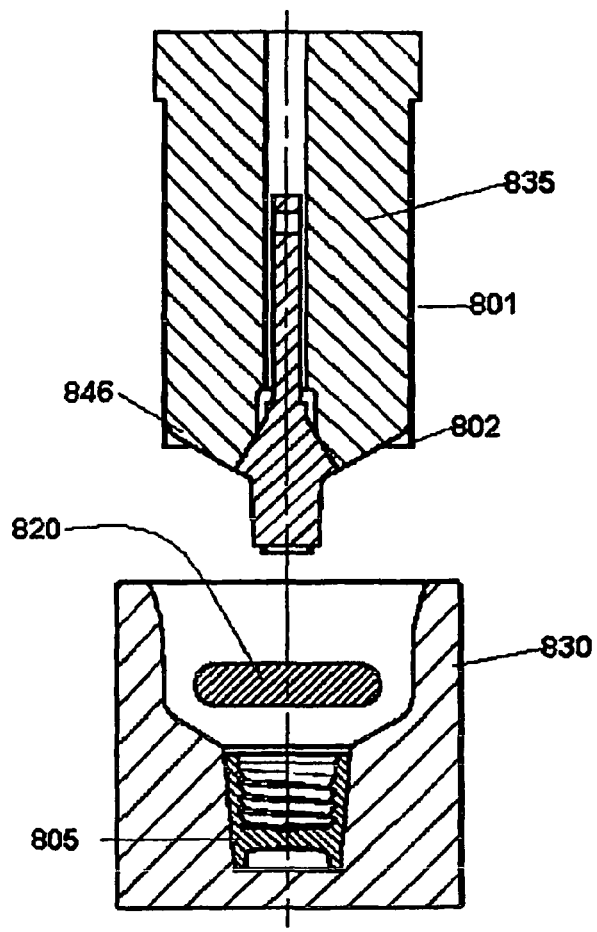
FIG. 6a shows the device before compression insert moulding of the tube head on the cap.
Figure 6B:
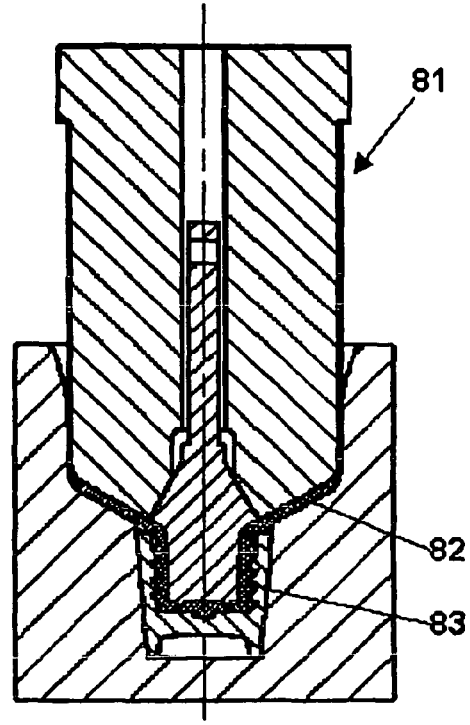
FIG. 6b shows the device after compression insert moulding of the tube head on the cap.
Figure 6C:
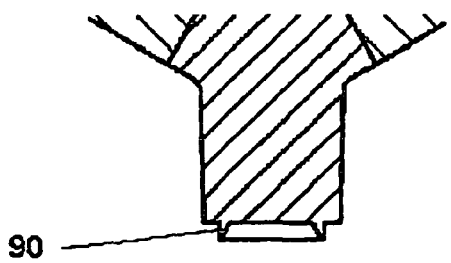
FIGS. 6c), 6e) and 6g) illustrate parts of the tooling provided with the toroidal edge that forms the breakoff zone (6c): the punch shown in 6e), and the stopper shown in 6g)
Figure 6D:
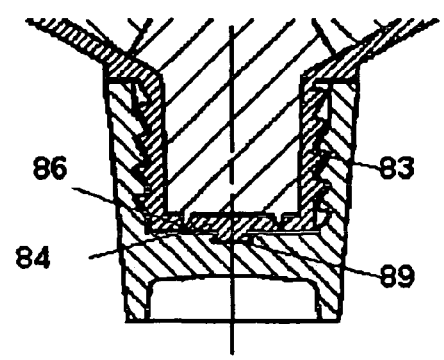
FIGS. 6d), 6f) and 6h) show details of the assembly of the tube head+ stopper obtained after insert moulding in three different cases.
Figure 6E:
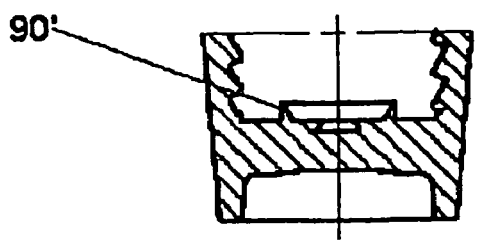
FIG. 6 shows three variants of an embodiment of the invention in which the neck is insert moulded by compression on a stopper that was previously placed in a cavity of the die.
Figure 6F:
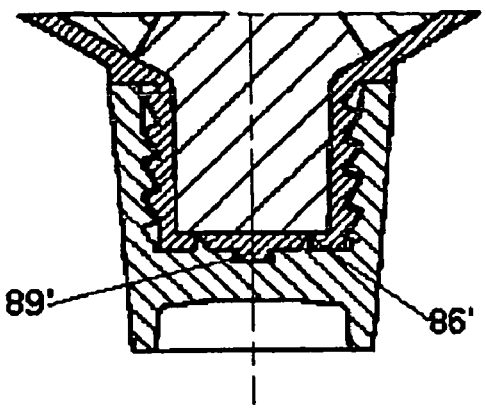
Figure 6G:
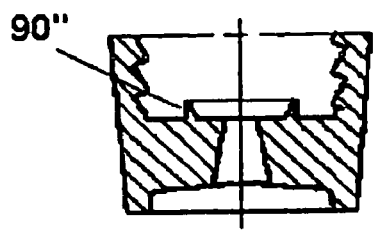
Figure 6H:
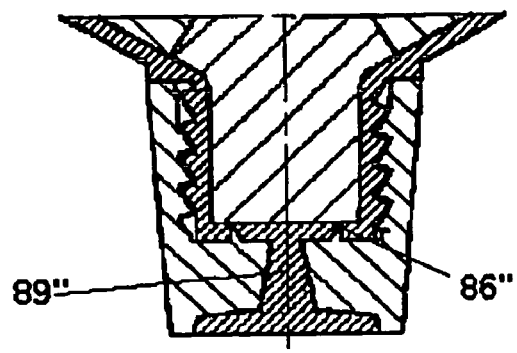

FIG. 6a shows a stopper 805 that is placed in the cavity of the die 830. As indicated in international application PCT/FR02/00686, this stopper may itself have been moulded shortly before, using the same die, but it is also possible that it was obtained independently on another moulding device. Outside this cavity, the shape of the cavity in the die 830 defines the outer surface of the shoulder 82 of the tube. The inner surface of the stopper 805 defines the inner surface of the neck 83 and the bottom of the neck.

The punch 835 is provided with a skirt 801 for which the end 802 slightly projects beyond the shoulder 846 of the punch. The average thickness of this stopper 805 is 1 mm. The inner surface of the cap, possibly provided with one or several screw threads, defines the outer surface of the neck to be formed. The part of the cavity of the die 830 that is not covered by the stopper defines the outer surface of the shoulder. The die 830 acts as a support tool.

A low density polyethylene blank 820 taken at the exit from the extruder is deposited either on the end of the punch or in the cavity of the die 820. It is compressed by bringing the punch and die towards each other until the screwed shape of the head is obtained. Under the effect of this translation, the blank 820 is deformed and flow of the plastic material is guided by free surfaces of the residual air gap that progressively reduces the volume. When the punch 835 and the die 830 touch each other, they define a moulding cavity in which the end 802 of the skirt is trapped. Under the effect of compression, the plastic material of the blank flows and fills in the various parts of the volume delimited by the cavities of the punch and the die, thus forming the shoulder 82 and the neck 83 provided with a top transverse wall 84 and a breakoff zone 86. The plastic material also comes into contact with the end 802 of the skirt. The plastic materials used in the head and the skirt are intimately welded together without any addition of heat or material. They remain welded together after keeping under low pressure and after cooling.

The tools are moved apart and the assembly is extracted. The assembly is allowed to cool to enable complete dimensional stabilisation of the neck and the cap.

The breakoff zone (86, 86', 86") is formed using a moulding part that is provided with a toroidal-shaped edge (90, 90', 90"). This toroidal edge belongs either to the male tool (punch—FIG. 6c)-90), or to the stopper (FIG. 6e) (90') and FIG. 6g (90")). In the first case (FIG. 6c) and 6d)), the break takes place on the outer surface, but there is a small risk of a run appearing because the steel toroidal edge makes it possible to impose sharp angles, therefore with a high multiplication factor on stresses occurring in the breakoff zone during rupture. In other cases, a run that might result from breakage of the breakoff zone may remain unseen inside the neck.

The breakoff element may be fixed to the cap, by including a reverse tapered protuberance 89 or 89' on the cap. The tube will only be actually opened the first time that the stopper is unscrewed and the breakage force could then be considered as a non-violability system.

A slight relief such as a rice grain can be provided at the end of the screwing thread, in order to prevent the stopper from being unscrewed after the head has been formed. The reverse tapered protuberance can pass through the thickness of the stopper (89") and the material thus extruded through the stopper may be used to fill the top of the stopper and particularly to form a personalised decor, for example a customer logo.

Advantages
- simple moulding tool;
- elimination of defects associated with previous methods of making the orifice (runs, pollution, seizure, etc.);
- better reproducibility of the blank in terms of weight which improves the reliability of compression moulding;
- easily adapted to a non-stop manufacturing method.

The invention claimed is:

1. Compression molding method using continuously moving tools for manufacturing plastic parts having a neck provided with an orifice, comprising the steps of:
    bringing the blank to an appropriate temperature, and then placing the blank in an air gap between at least two moving parts of a compression molding tool and bringing the at least two moving parts towards each other to compress the blank,
    the plastic material of the blank being caused thereby to flow so as to fill cavities in the moving parts until the moving parts stop moving relative to each other, the cavities once brought towards each other defining a volume of the part with a neck,
    constructing the compression tool to produce a molded neck having a top wall that comprises a thinned zone having a contour that delimits a shape of the orifice,
    the compression tool being constructed such that the thinned zone is bounded by a notch having section in a diametric plane passing through the axis of the neck which is oriented along a direction approximately parallel to the axis of the neck, and such that the top wall also comprises a breakoff zone in which a mechanical force can be applied to the top wall with sufficient intensity to break the top wall at the notch, the application zone being distinct from the thinned zone,
    the compression tool further being constructed such that the top wall also includes two zones that can resist the mechanical force, one of the zones being designed to transmit the mechanical force and the other of the zones acting as a support, a protuberance extending from the top wall parallel to the axis of the neck, and
    opening the molding tool by relative displacement of the moving parts, during which a moving part of the molding tool applies a bending force to the protuberance sufficient to cause a break to occur at the notch and detach at a wall of the top wall.

2. Method according to claim 1, wherein the breakoff zone breaks during cooling after molding, under a force applied as soon as the temperature of the plastic material becomes close to a vitreous transition temperature in the breakoff zone.

3. Process according to claim 1, wherein the breakoff zone comprises a V-shape notch, the V having an angle of between 30 and 90°, and having a bisecting line forming an angle of between 0 and 45° with the axis of the neck.

4. Method according to claim 1, wherein the top wall comprises a transverse wall and a stick having an end at which a force can be is applied laterally to cause breakage of the breakoff zone.

5. Method according to claim 1, wherein the top wall comprises a transverse wall acting as a shutter and a protuberance with a T-shaped profile, forming a ring groove on an outer surface thereof, in which prongs of a fork or a rail may be engaged, with relative displacement causing tearing off and then removal of the shutter.

6. Method according to claim 1, wherein the parts of the compression molding tool are also moved by a continuous movement orthogonal to the direction along which the parts move towards each other.

7. Method according to claim 1, wherein the compression molding tool comprises a first moving part and a second moving part, the first moving part, at least in a part of the cavity used for shaping the said breakoff zone, being made of a material that is less rigid than a material used for the second moving part.

8. Method according to claim 7, wherein the first moving part is made of plastic material, at least in the cavity part used for shaping the breakoff zone, and the second moving part is metallic.

9. Method according to claim 8, wherein the first moving part comprises a cavity provided with a stopper to close off the orifice, the stopper being positioned such that an inner surface thereof acts partially as a molding cavity for shaping the neck, at least at the breakoff zone.

10. Process according to claim 9, wherein the breakoff zone is shaped using a part of the stopper which forms a toroidal edge.

11. Process according to claim 7, wherein the breakoff zone is shaped by a moving part portion forming a toroidal edge.

* * * * *